United States Patent
Drown et al.

(10) Patent No.: US 10,853,283 B1
(45) Date of Patent: Dec. 1, 2020

(54) INTEGRATED CIRCUITS FOR GENERATING INPUT/OUTPUT LATENCY PERFORMANCE METRICS USING REAL-TIME CLOCK (RTC) READ MEASUREMENT MODULE

(71) Applicant: Intel Corporation, Santa Clara, CA (US)

(72) Inventors: Garrett Matthias Drown, Chandler, AZ (US); Patrick Lu, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/445,500

(22) Filed: Jun. 19, 2019

(51) Int. Cl.
*G06F 13/20* (2006.01)
*G06F 9/30* (2018.01)
*G06F 13/12* (2006.01)
*G06F 3/00* (2006.01)

(52) U.S. Cl.
CPC .......... *G06F 13/20* (2013.01); *G06F 9/30098* (2013.01); *G06F 13/126* (2013.01); *G06F 3/00* (2013.01); *G06F 2213/0026* (2013.01)

(58) Field of Classification Search
CPC . G06F 13/00; G06F 13/20; G06F 3/00; G06F 9/30098; G06F 13/126
See application file for complete search history.

(56) References Cited

U.S. PATENT DOCUMENTS

| | | | | |
|---|---|---|---|---|
| 7,996,839 B2* | 8/2011 | Farkas | ................ | G06F 9/5044 |
| | | | | 718/102 |
| 8,949,290 B2* | 2/2015 | Chaterjee | ............... | G06F 11/34 |
| | | | | 707/809 |
| 8,972,689 B1 | 3/2015 | de la Iglesia | | |
| 2019/0065420 A1* | 2/2019 | Trojanowski | ........ | G06F 13/366 |
| 2019/0370062 A1* | 12/2019 | Leyrer | ................ | G06F 9/5038 |

OTHER PUBLICATIONS

"PCI Express® Base Specification, Revision 3.0"; Nov. 10, 2010; 860 pages, PCI-SIG.
"Root complex"; lasted edited on Apr. 25, 2018, 1 page, Wikipedia, https://en.wikipedia.org/wiki/Root_complex.

(Continued)

*Primary Examiner* — Tammara R Peyton
(74) *Attorney, Agent, or Firm* — Trop, Pruner & Hu, P.C.

(57) ABSTRACT

An integrated circuit includes technology for generating input/output (I/O) latency metrics. The integrated circuit includes a real-time clock (RTC), a read measurement register, and a read latency measurement module. The read latency measurement module includes control logic to perform operations comprising (a) in response to receipt of read responses that complete read requests associated with an I/O device, automatically calculating read latencies for the completed read requests, based at least in part on time measurements from the RTC for initiation and completion of the read requests; (b) automatically calculating an average read latency for the completed read requests, based at least in part on the calculated read latencies for the completed read requests; and (c) automatically updating the read measurement register to record the average read latency for the completed read requests. Other embodiments are described and claimed.

23 Claims, 12 Drawing Sheets

(56) References Cited

OTHER PUBLICATIONS

"PCI Express", lasted edited on May 5, 2019, 26 pages, Wikipedia, https://en.wikipedia.org/wiki/PCI_Express.
"Intel® Xeon® Processor Scalable Memory Family Uncore Performance Monitoring Reference Manual", Jul. 2017, 236 pages, Intel® Corporation.
Budruk, "An Introduction to PCI Express", downloaded May 17, 2019, 18 pages, https://www.mindshare.com/files/resources/MindShare_Intro_to_PCIe.pdf.
Lawley, "Understanding Performance of PCI Express Systems", Oct. 28, 2014, 16 pages, Xilinx, Inc.
European Patent Office, European Search Report mailed Sep. 25, 2020 in European patent application No. 20164440.8, 7 pages total.

* cited by examiner

INTEGRATED CIRCUITS FOR GENERATING INPUT/OUTPUT LATENCY PERFORMANCE METRICS USING REAL-TIME CLOCK (RTC) READ MEASUREMENT MODULE

TECHNICAL FIELD

The present disclosure pertains in general to data processing systems and in particular to technology for generating metrics pertaining to the performance of input/output devices.

BACKGROUND

The overall performance of a data processing system may be significantly affected by the efficiency of communications between one or more processor cores and one or more input/output (I/O) devices. For instance, high I/O response time may cause wasted core cycles, and wasted core cycles may cause sub-optimal performance. In addition, a conventional data processing system lacks features for efficiently generating performance metrics for communications between cores and I/O devices.

As described in greater detail below, the present disclosure introduces technology for generating metrics pertaining to the performance of I/O devices.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

If a data processing system could measure certain aspects of I/O device performance, those measurements could then be used to tune, configure, and/or redesign certain aspects of the data processing system in such a way as to improve the overall performance of the data processing system. In particular, it could be useful to generate metrics such as minimum response time, maximum response time, and average response time for one, some, or all of the I/O devices in the data processing system. For purposes of this disclosure, such metrics may be referred to in general as I/O performance metrics and more specifically as I/O response time metrics or I/O latency metrics.

A conventional data processing system lacks features for accurately and efficiently generating I/O latency metrics. Moreover, it may be difficult or impossible to develop software that would be capable of efficiently generating accurate I/O latency metrics in a conventional data processing system.

By contrast, a data processing system according to the present disclosure includes technology for generating I/O latency metrics. Moreover, such technology may be very accurate and very efficient, and it may generate such metrics in real time. Additionally, this technology may be implemented without adding extensive circuitry to the design of a conventional integrated circuit, and this technology may enable hardware and software designers to optimize system performance.

Figure 1:
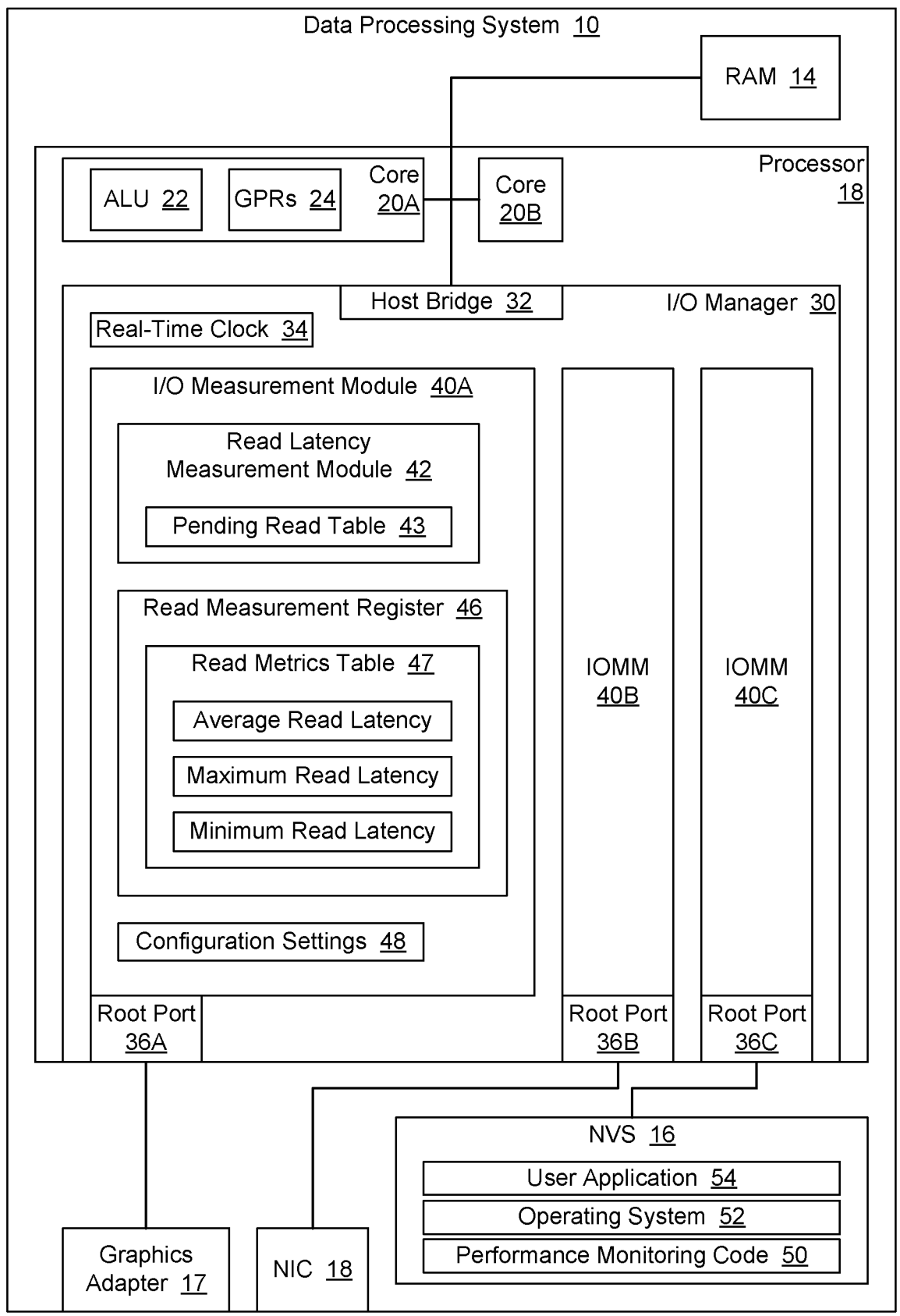
FIG. 1 is a block diagram depicting an example embodiment of a data processing system with technology for generating I/O latency metrics.

FIG. 1 is a block diagram depicting an example embodiment of a data processing system 10 with technology for generating I/O latency metrics. Data processing system 10 includes a processor 12 in communication with random access memory (RAM) 12. In the embodiment of FIG. 1, processor 12 is a central processing unit (CPU) with two processing cores 20A and 20B. However, in alternative embodiments, a data processing system may include one or more CPUs, and each CPU may include one or more cores.

In the embodiment of FIG. 1, core 20A includes various processing resources, such as at least one arithmetic logic unit (ALU) 22, a set of general purpose registers (GPRs) 24, etc. Core 20B may include the same or similar types of processing resources.

Data processing system 10 also includes various I/O devices, such as non-volatile storage (NVS) 16, a network interface controller (NIC) 18, and a graphics adapter 17. NVS 16 may be a Non-volatile Memory Express (NVMe) drive, for instance. Cores 20A and 20B may communicate with those I/O devices via an I/O manager 30. For purposes of this disclosure, any device that a processing core communicates with via an I/O manager may be referred to as an I/O device. Accordingly, I/O devices may include field programmable gate arrays (FPGAs), Peripheral Component Interconnect Express (PCIe) solid-state drives (SSDs), Serial AT Attachment (SATA) disks connected to a PCIe controller, accelerators, etc. Also, in an alternative embodiment, one or more cores may connect to RAM via an I/O manager. Nevertheless, RAM is not considered to be an I/O device.

In the embodiment of FIG. 1, I/O manager 30 is an integrated I/O controller that resides in the same integrated circuit as cores 20A and 20B. However, in other embodiments, data processing systems may use I/O managers that reside in separate integrated circuits from the processing cores. For example, the cores and the I/O manager may reside in separate chips in a multi-chip package, or the I/O manager may reside in a separate package from the cores. Furthermore, a data processing system may include multiple I/O managers. For instance, a data processing system may include a CPU that contains multiple I/O managers, multiple CPUs that each contain one I/O manager, etc.

As indicated above, a core may communicate with an I/O device via an I/O manager. In particular, when a core reads from an I/O device via an I/O manager, the I/O manager handles that read transaction by (a) sending a read request to the I/O device on behalf of the core, (b) waiting for a corresponding response (or multiple responses) from the I/O device, and then (c) communicating the result back to the core. If the read was successful, the result will include the data that was read from the I/O device. If the read was not successful, the result may include an error message (or no result at all). Thus, read transactions involve request messages that are separate in time from the corresponding response messages. For instance, the read request that the I/O manager sends to the I/O device is separate in time from the corresponding response that the I/O device sends to the I/O manager. Consequently, a read transaction may be referred as a split transaction.

For purposes of this disclosure, communications between a core and an I/O manager may be referred to as host communications, and communications between an I/O manager and an I/O device may be referred to device communications. In particular, for a read transaction, the request from the core to the I/O manager may be referred to as a host read request, and the subsequent message (with the result) from the I/O manager to the core may be referred to as a host read response. Similarly, the message from the I/O manager to the I/O device may be referred to as a device read request, and the subsequent message from the I/O device to the I/O manager may be referred to as a device read response.

In the hypothetical embodiment of FIG. 1, I/O manager 30 complies with revision 3.0 of the PCIe base specification (the "PCIe Specification"). I/O manager 30 may also comply with subsequent versions of the PCIe Specification (e.g., revision 4.x, 5.x, etc.). In particular, I/O manager 30 may serve as a PCIe root complex, containing a host bridge and a multiple root ports. However, in other embodiments, data processing systems may include I/O managers which comply with other specifications and/or with proprietary I/O device management protocols.

In the embodiment of FIG. 1, NVS 16 includes various software components, including an operating system (OS) 52, a user application 54, and performance monitoring code 50. Data processing system 10 may copy such software components into RAM 14 for execution. As described in greater detail below, I/O manager 30 may generate metrics pertaining to the performance of the I/O devices in data processing system 10, and one or more of those software components may use those performance metrics to improve or optimize system performance.

In the embodiment of FIG. 1, I/O manager 30 includes a host bridge 32 to enable communications between I/O manager 30 and cores 20A and 20B. I/O manager 30 also include a real-time clock (RTC) 34. I/O manager 30 also include multiple root ports 36A, 36B, and 36C to enable communications between I/O manager 30 and the I/O devices. In particular, I/O manager 30 communicates with graphics adapter 17 via root port 36A, with NIC 18 via root port 36B, and with NVS 16 via root port 36C. However, in one or more alternative embodiments, an I/O manager may communicate with more than one I/O device via a single root port. For instance, a root port may connect to a switch, the switch may connect to two or more I/O devices, and the I/O manager may communicate with those I/O devices via that root port and that switch.

In the embodiment of FIG. 1, the components within I/O manager 30 for generating performance metrics include I/O measurement modules (IOMMs) 40A, 40B, and 40C. Each IOMM generates metrics for a different root port, with IOMM 40A generating metrics for communications which use root port 36A, IOMM 40B generating metrics for communications which use root port 36B, and IOMM 40C generating metrics for communications which use root port 36C. Accordingly, when a root port is connected to only one I/O device, the corresponding IOMM generates metrics for that particular I/O device. And when a root port is connected to multiple I/O devices, the corresponding IOMM generates aggregate metrics for those multiple I/O devices.

As illustrated within IOMM 40A, the components within an IOMM for generating performance metrics include a read latency measurement module 42, a read measurement register 46, and configuration settings 48. Although not illustrated in FIG. 1, IOMMs 40B and 40C may also include such components. In an alternative embodiment, each IOMM may include its own RTC for determining start times and completion times.

In the embodiment of FIG. 1, read latency measurement module 42 includes a pending read table 43. Also, read measurement register 46 includes a read metrics table 47. As described in greater detail below, read latency measurement module 42 (a) monitors device read requests and device read responses which traverse root port 36A, (b) generates I/O device performance metrics based on those requests and responses, and (c) saves those metrics to read metrics table 47 in read measurement register 46. In the embodiment of FIG. 1, those metrics include average read latency, maximum read latency, and minimum read latency, for read requests involving root port 36A. Other components of data processing system 10 (e.g., performance monitoring code 50) may then use those metrics to improve or optimize overall system performance.

Also, FIG. 1 depicts an IOMM with a single read measurement register. However, in an alternative embodiment, each IOMM may use multiple registers to store measurements such as average, minimum, and maximum read latency. For instance, an IOMM may use a "running average register" to store the average read latency, a "minimum latency register" to store the minimum read latency, and a "maximum latency register" to store the maximum read latency.

Figure 2:
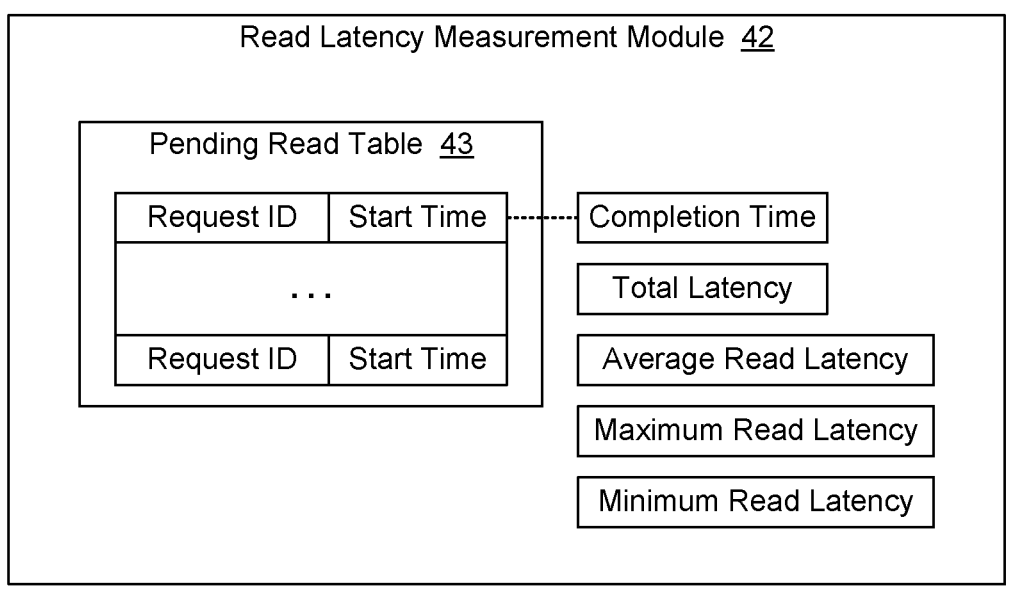
FIG. 2 is a block diagram depicting the read latency measurement module of FIG. 1 in greater detail.

FIG. 2 is a block diagram depicting read latency measurement module 42 in greater detail. As indicated above, read latency measurement module 42 includes pending read table 43. Read latency measurement module 42 may use pending read table 43 to provide for time-out processing for read requests. In particular, for each device read request that IOMM 40A transmits via root port 36A, read latency measurement module 42 may store a request identifier (ID) for that read request and a start time for that read request in pending read table 43. And read latency measurement module 42 may determine that start time based on RTC 34. IOMM 40A may be configured with a predetermined timeout limit. And if IOMM 40A does not see a response for a read request before that timeout limit is reached, IOMM 40A may conclude that the read request has timed out or expired. Accordingly, IOMM 40A may perform timeout processing for that read request. For instance, IOMM 40A may send a host response to the core associated with the expired request, and that host response may indicate that the read request timed out or expired.

Furthermore, read latency measurement module 42 automatically computes performance metrics for reads that complete successfully. In particular, whenever IOMM 40A receives a device read response that completes a device read request, read latency measurement module 42 uses RTC 34 to determine the completion time of that request. Read latency measurement module 42 may then add that completion time to pending read table 43. In addition or alternatively, read latency measurement module 42 may save the completion time in a different place, such as a work register. In addition, read latency measurement module 42 determines the total elapsed time for completion of the read request, based on the start time and completion time. That total elapsed time may also be referred to as the total latency or the calculated latency. Once the total latency has been calculated, the associated entry in pending read table 43 may be removed or reused. Thus, read latency measurement module 42 calculates latency for completed device read requests based on time measurements from RTC 34 for initiation and completion of those requests.

In addition, as described in greater detail below, read latency measurement module 42 uses the calculated latency for each completed request to generate more general performance metrics for root port 36A. Read latency measurement module 42 may then store those metrics in read metrics table 47. For instance, read latency measurement module 42 may calculate an average read latency, a maximum read latency, and a minimum read latency, for all completed device read requests that have traversed root port 36A. And since root port 36A is connected only to graphics adapter 17, those performance metrics apply as well to graphics adapter 17.

Figure 3A:
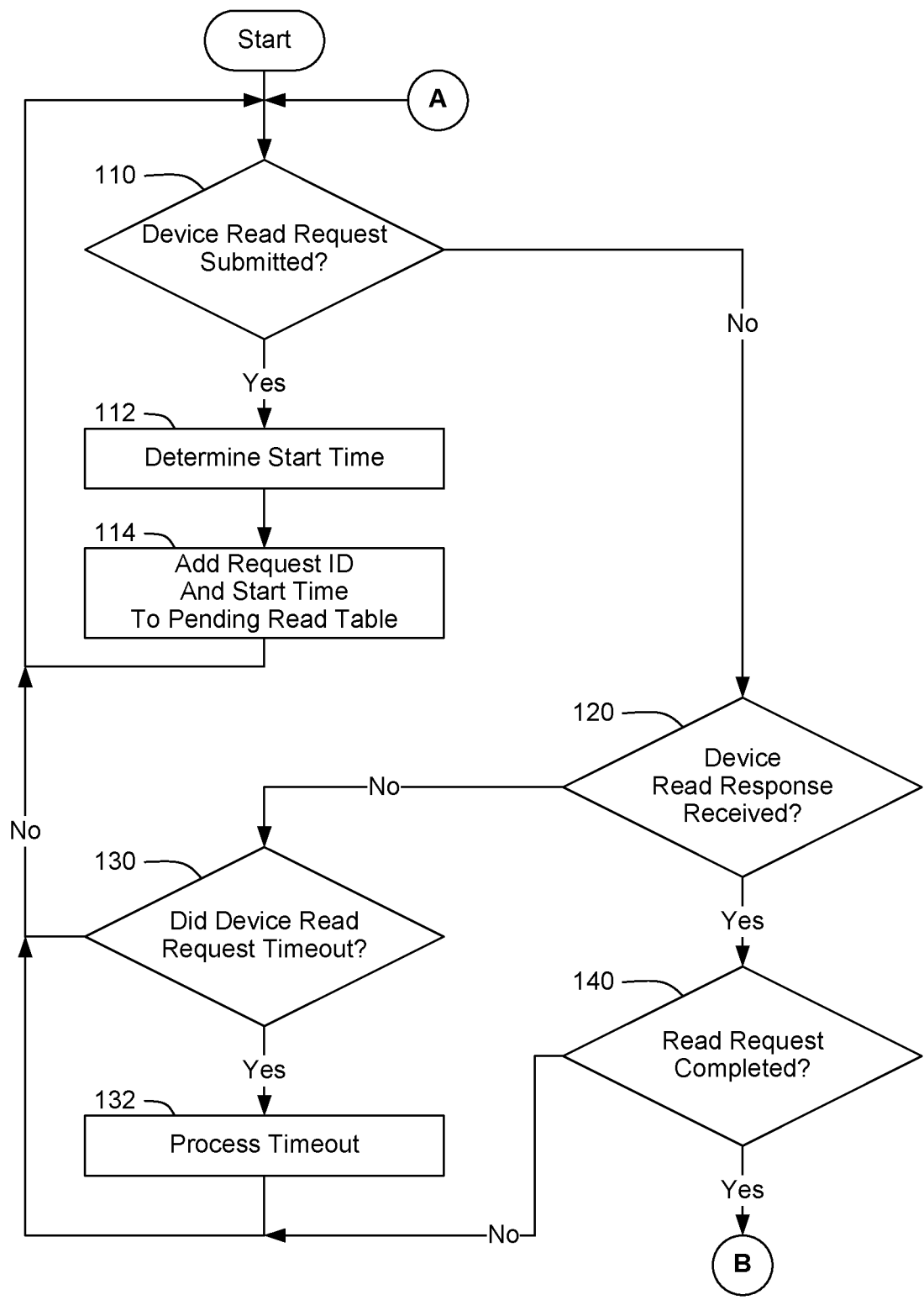
FIGS. 3A and 3B present a flowchart of an example embodiment of a process for generating I/O latency metrics.
Figure 3B:
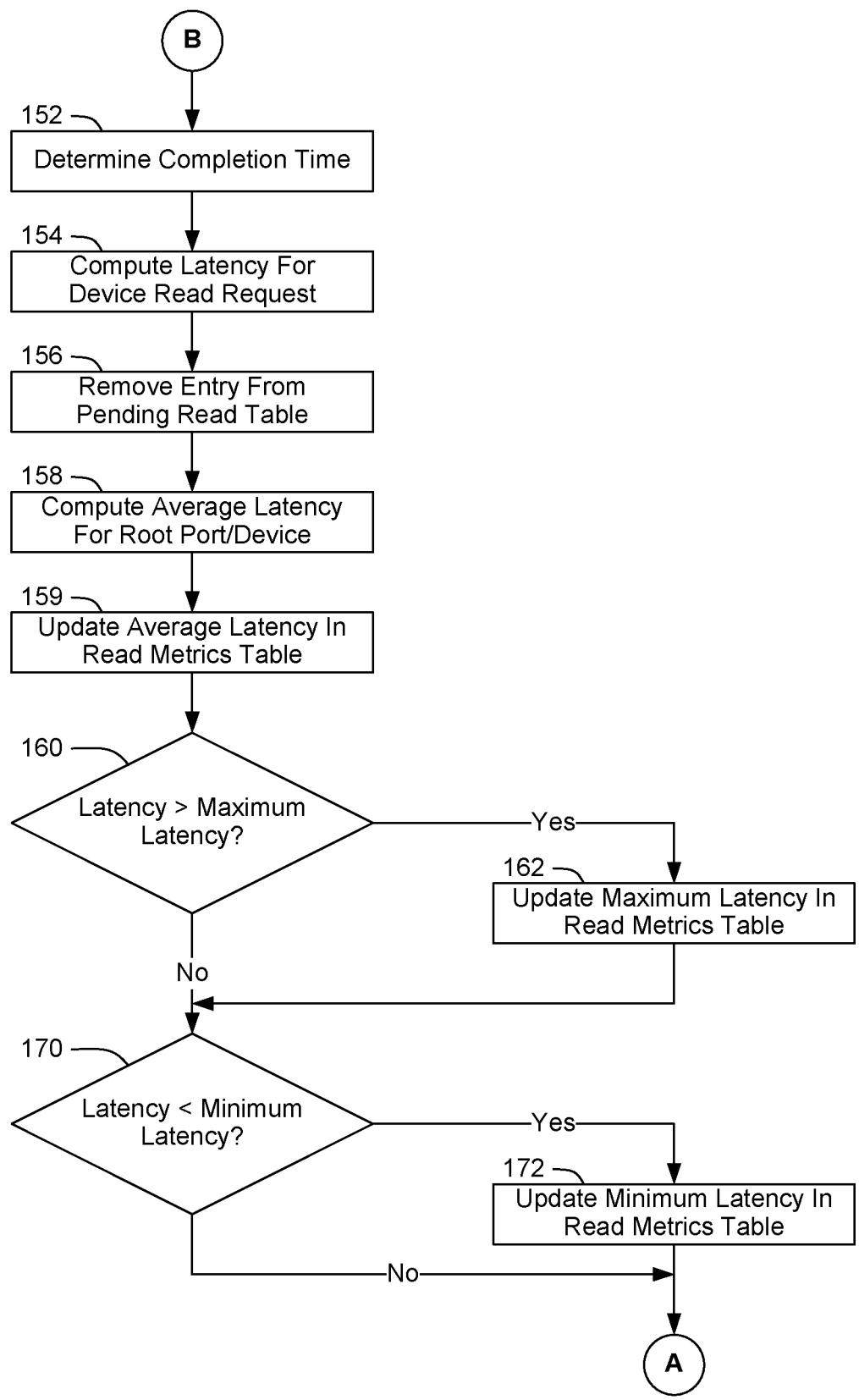

FIGS. 3A and 3B present a flowchart of an example embodiment of a process for generating I/O latency metrics. That process is described with regard to the embodiment of FIG. 1. In particular, for purposes of illustration, the process is described with regard to IOMM 40A generating performance metrics for graphics adapter 17, which is accessed via root port 36A. However, each IOMM in an I/O manager may use the same process to generate performance metrics for the I/O device (or devices) accessed via the root port associated with that IOMM.

The process of FIG. 3A starts at block 110 with IOMM 40A determining whether I/O manager 30 has just sent a device read request to an I/O device via root port 36A. If such a read request was just sent, IOMM 40A determines the start time for that read request, based on RTC 34, as shown at block 112. And as shown at block 114, IOMM 40A adds an entry to pending read table 43 to record the start time for that read request, along with a tag or request ID for that read request. Thus, IOMM 40A tracks the start time for each device read request that traverses root port 36A.

After updating pending read table 43, or if no read request was detected at block 110, IOMM 40A may then determine whether I/O manager 30 has just received a device read response via root port 36A, as shown at block 120. If no such response was received, IOMM 40A may determine whether any device read requests have timed out, as shown at block 130. For instance, I/O manager 30 may be configured with a predetermined timeout threshold, and IOMM 40A may use pending read table 43 and RTC 34 to determine whether any of the pending device read requests have been pending for longer than the timeout threshold. As shown at block 132, if a device read request has timed out, IOMM 40A may perform timeout processing for that request. Timeout processing may include any suitable operations, such as retrying the read request a predetermined number of times, sending an error result to report the timeout to the core associated with the read request, removing the entry from pending read table 43, etc. The process may then return to block 110, with IOMM 40A repeating the operations described above and below, as applicable.

Referring again to block 120, in response to I/O manager 30 receiving a device read response via root port 36A, IOMM 40A may determine whether that response completes a device read request, as shown at block 140. For instance, if the request required only a single response, IOMM 40A may consider the request completed when that response is received. Or if the request required multiple responses, IOMM 40A may consider the request completed when the last required response is received. In one embodiment, each device read request and each device read response includes a tag or request ID, and IOMM 40A uses that request ID to match each response to the corresponding request.

If IOMM 40A determines that a received device read response does not complete a device read request, the process may return to block 110, with IOMM 40A repeating the operations described above and below, as applicable. However, if a received device read response does complete a device read request, the process may pass through page connector B to FIG. 3B, which illustrates various operations performed by IOMM 40A in response to a positive determination at block 140.

In particular, as shown at block 152, read latency measurement module 42 in IOMM 40A uses RTC 34 to determine the completion time for the device read request. Also, read latency measurement module 42 uses that completion time and the start time from pending read table 43 to compute the total latency for the device read request, as shown at block 154. Also, as shown at block 156, IOMM 40A removes the entry for the completed device read request from pending read table 43.

Read latency measurement module 42 also uses the calculated latency for the completed device read request to update the I/O latency metrics pertaining to root port 36A and graphics adapter 17 in read metrics table 47. In particular, as shown at block 158, read latency measurement module 42 calculates a running average for the read latency for root port 36A and graphics adapter 17, based on the calculated latency for the completed device read request. And as shown at block 159, read latency measurement module 42 uses that result to update the average read latency in read metrics table 47.

To reduce the rate of overflows, read latency measurement module 42 may compute the average read latency using a formula that does not require a sum of all latencies to be maintained. For instance, in one embodiment, read latency measurement module 42 uses a formula such as the following:

new-average=old-average+(new-latency−old-average)/count where "count" indicates how many completed device read requests have been used to generate the "new-average" latency value. With such a formula, the most probable source of overflow would only occur when the value of "count" exceeds $2^{64}$ (assuming a 64-bit counter). With 64-byte reads at conventional I/O speeds, that might take over 1000 years.

Also, as shown at block 160, read latency measurement module 42 determines whether the computed latency is greater than the maximum latency measured so far. If it is, read latency measurement module 42 updates the maximum latency value in read metrics table 47, as shown at block 162. Also, as shown at block 170, read latency measurement module 42 determines whether the computed latency is less than the minimum latency measured so far. If it is, read latency measurement module 42 updates the minimum latency value in read metrics table 47, as shown at block 172.

As described above, in one embodiment, read latency measurement module 42 computes the latency for a device read request based on the time of the last response that was required to complete the request. Accordingly, the latency may be referred to as last completion latency. However, in another embodiment or scenario, the read latency measurement module may compute the latency for a device read request based on the time of the first response which corresponds to that read request. In that case, the latency may be referred to as first completion latency. In another embodiment or scenario, the read latency measurement module may compute both last completion latency and first completion latency, and the read latency measurement module may generate and save two sets of general I/O latency metrics (e.g., average, minimum, and maximum latency), with one set based on last completion latency and the other based on first completion latency.

Referring again to FIG. 3B, after read latency measurement module 42 generates and saves the general performance metrics, the process may then return to block 110 of FIG. 3A via page connector A, with IOMM 40A repeating the operations described above and below, as applicable.

Thus, as described above, IOMM 40A generates and saves I/O latency metrics for communications between the cores of processor 18 and graphics adapter 17. And the other IOMMs generate and save I/O latency metrics for communications between the cores of processor 18 and the I/O devices connected to the other root ports of I/O manager 30. As indicated above, those metrics provide information about I/O device response time. In particular, those metrics indicate the average, minimum, and maximum latency for completed device read requests associated with each different root port that is managed by I/O manager 30.

In one embodiment, read latency measurement module 42 is implemented using control logic which does not require much space or "real estate" within I/O manager 30. In addition, that control logic does not impact signal integrity. Also, I/O manager 30 enables components such as performance monitoring code 50, OS 52, and/or user application 54 to obtain metrics concerning I/O response time without using external hardware. Moreover, I/O manager 30 enables users to run extended tests and capture very accurate minimum, maximum, and average latency values without capturing an enormous amount of data. For instance, a test may be run (and data collected) for minutes, hours, days, weeks, or even longer.

As indicated above, a data processing system may include various software components which use the performance metrics from a read measurement register to improve or optimize system performance. For purposes of this disclosure, a software or hardware component which (a) obtains performance metrics from a read measurement register and (b) uses those metrics to facilitate performance improvements may be referred to as a metrics consumer. Metrics consumers may obtain such performance metrics directly from a read measurement register, or indirectly, via one or more intermediate components. As described in greater detail below, metrics consumers may be applications, OSs, drivers, or any other component which uses I/O latency metrics like those described herein.

In the embodiment of FIG. 1, each IOMM includes configuration settings 48 which may be read and modified by a metrics consumer. Configuration settings 48 may reside in a special-purpose register (SPR) or a model-specific register (MSR), for example. A metrics consumer may update configuration settings 48 to configure components such as IOMMs and read latency measurement modules. For instance, a metrics consumer may write a particular value to configuration settings 48 to cause IOMM 40A to reset the latency values in read metrics table 47.

The technology described herein may be used in many different embodiments of data processing systems and many different scenarios to realize or facilitate improved performance, relative to conventional data processing systems. For instance, metrics consumers may utilize the performance metrics to dynamically realize performance improvements. In addition or alternatively, metrics consumers may use the metrics to facilitate debugging, benchmarking, and other types of operations.

With regard to dynamically realizing performance improvements, in one embodiment, a user application may include logic for making determinations concerning I/O device performance and for taking action based on those determinations. For instance, the application may send more work to I/O devices with low latency. The application may read the average, maximum, and minimum read latency values directly from the read measurement registers of the various IOMMs, or the application may obtain the latency metrics from an OS or other intermediate source.

In another embodiment, an OS may read the average, maximum, and minimum read latency values directly from the read measurement registers of the various IOMMs, and the OS may make determinations concerning system performance and take corresponding actions (e.g., reporting unusual conditions) based on those determinations. For instance, the OS may recognize and measure latency spikes, the OS may then correlate those spikes with events in the system, and the OS may then log or report its findings, thereby providing valuable information for debugging and root causing issues and/or developing performance optimizations.

In another embodiment, performance monitoring code that runs in a data processing system in a test or development environment may analyze the I/O latency metrics and generate reports based on that analysis. The analysis and reports may involve events such as latency spikes and corresponding events in the system, for instance. However, the generation of I/O latency metrics may be disabled in a production environment, or access to those metrics may be protected or disabled in the production environment.

In another embodiment, the I/O manager may be considered to be a performance monitoring ("PMON") component, it may reside in an uncore portion of a CPU along with other PMON components or units, and those PMON units may be governed by a global control. Metrics consumers may use techniques similar to those described in the Intel® Xeon® Processor Scalable Memory Family Uncore Performance Monitoring Reference Manual from July of 2017 (a) to access and configure components such as IOMMs, (b) to read latency measurement modules, and (c) to generate reports based on the metrics collected from those components.

In one embodiment, the read measurement register may be an SPR or MSR that metrics consumers can read and/or update. In another embodiment, the read measurement register may be a Peripheral Component Interconnect (PCI) register. In another embodiment, metrics consumers may obtain the performance metrics from the read measurement register via a PMON framework.

Additional Embodiments

Figure 4:
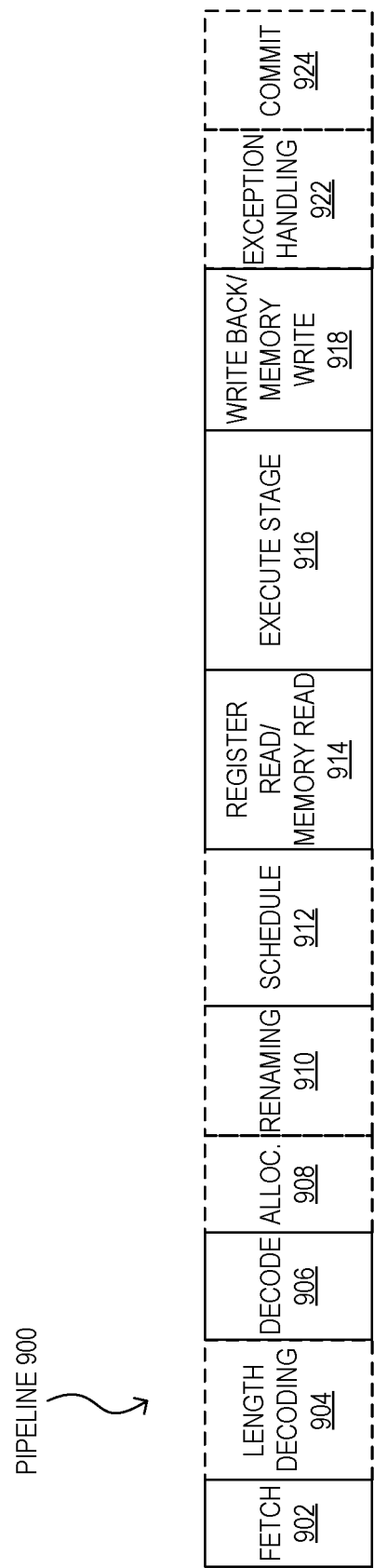
FIG. 4 is a block diagram illustrating both an exemplary in-order pipeline and an exemplary register renaming, out-of-order issue/execution pipeline according to embodiments of the invention.
Figure 5:
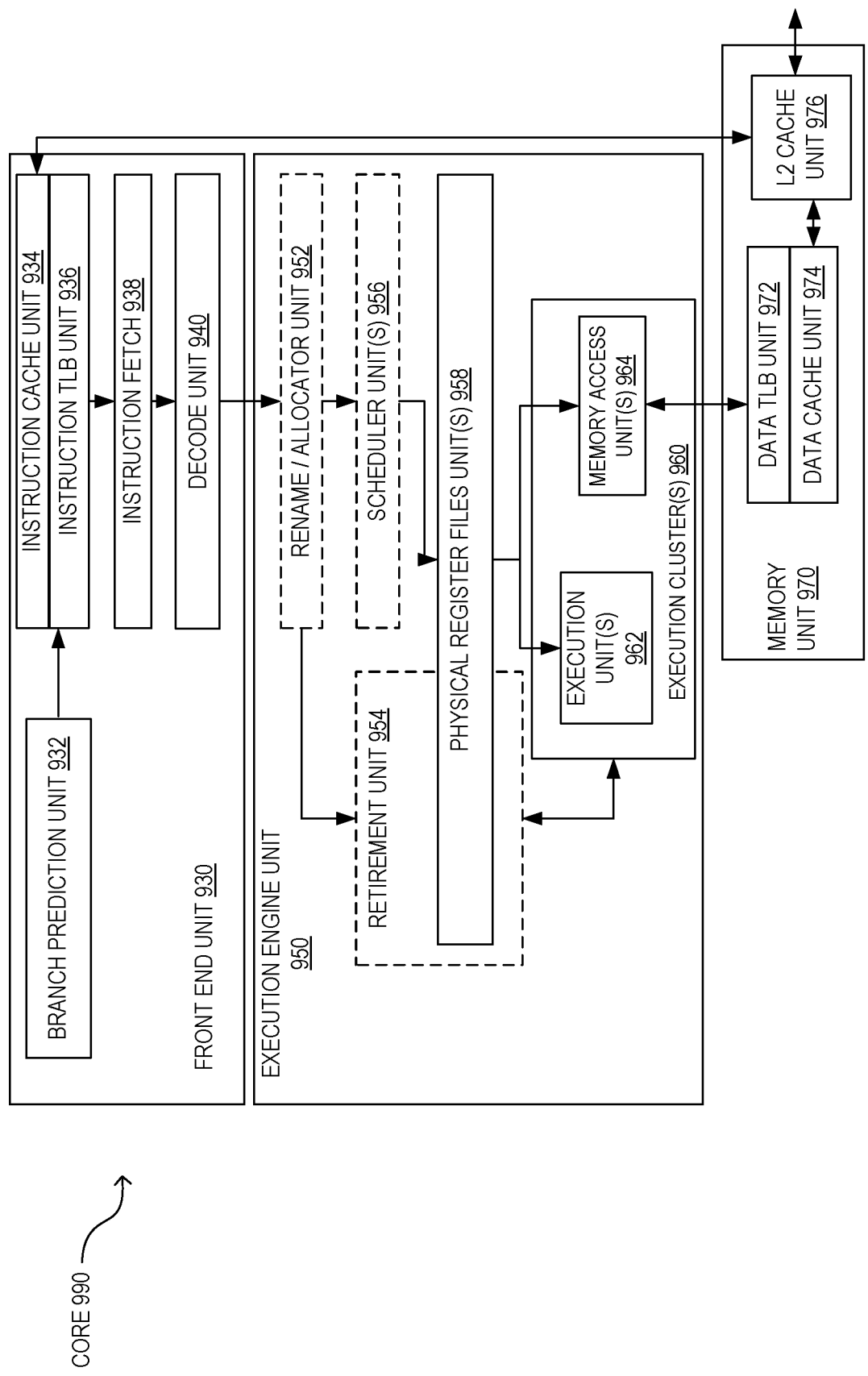
FIG. 5 is a block diagram illustrating both an exemplary embodiment of an in-order architecture core and an exemplary register renaming, out-of-order issue/execution architecture core to be included in a processor according to embodiments of the invention.

FIG. 4 is a block diagram illustrating both an exemplary in-order pipeline and an exemplary register renaming, outof-order issue/execution pipeline according to embodiments of the invention. FIG. 5 is a block diagram illustrating both an exemplary in-order architecture core and an exemplary register renaming, out-of-order issue/execution architecture core to be included in a processor according to embodiments of the invention. The solid lined boxes in FIGS. 4 and 5 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 5 shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, a compression engine, a coprocessor core, a general-purpose graphics processing unit (GPGPU), a graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964.

The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 performs the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
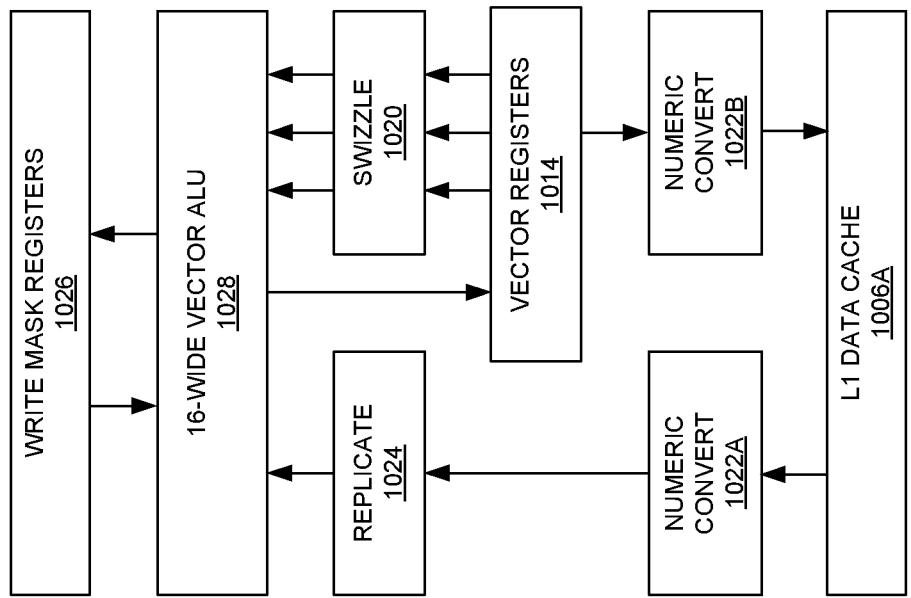
FIGS. 6 and 7 are block diagrams of a more specific exemplary in-order core architecture, which core would be one of several logic blocks (including other cores of the same type and/or different types) in a chip.
Figure 6:
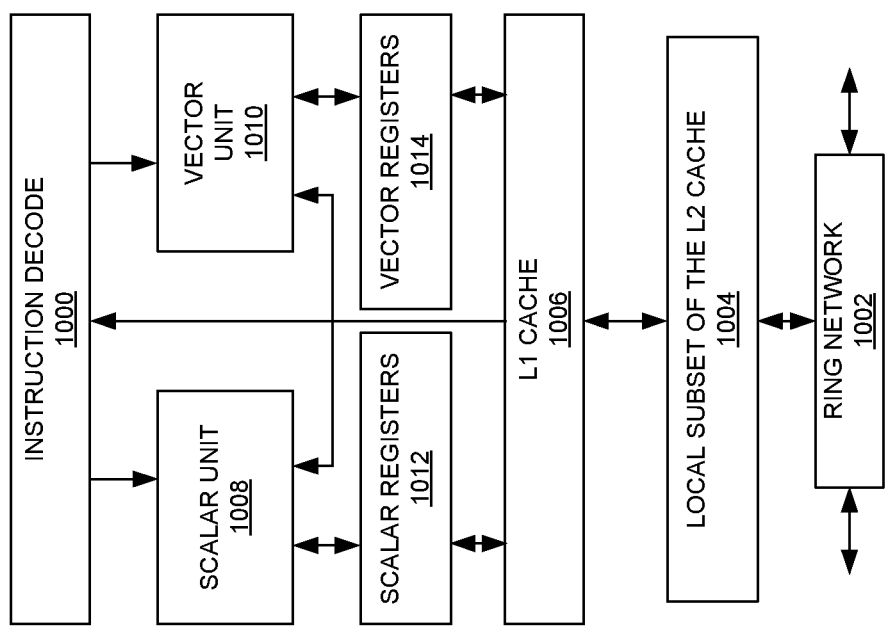

FIGS. 6 and 7 are block diagrams of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6 is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from an L1 cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7 is an expanded view of part of the processor core in FIG. 6 according to embodiments of the invention. FIG. 7 includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
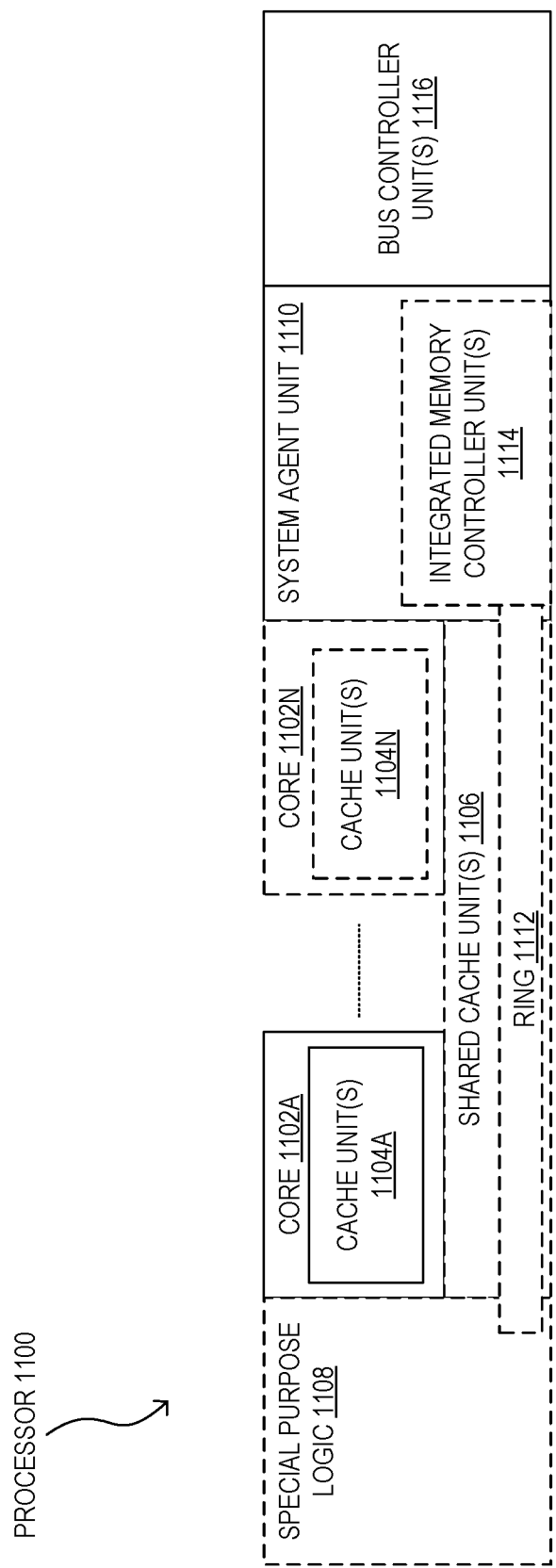
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 9:
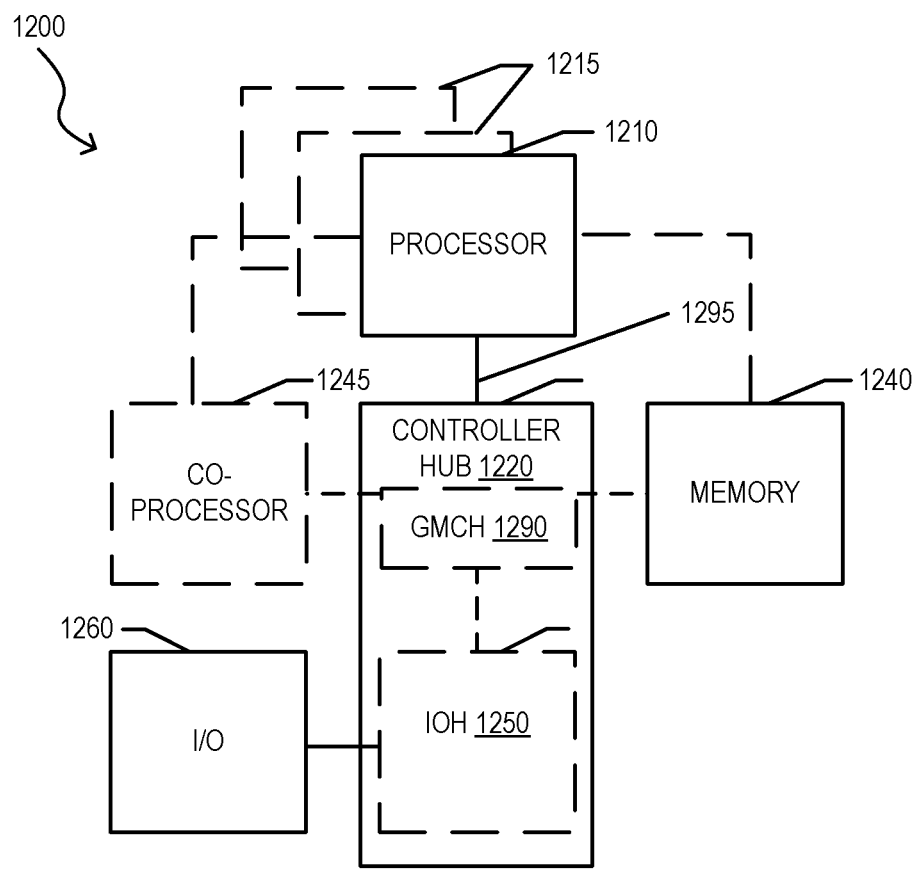
FIG. 9 is a block diagram of a system according to embodiments of the invention.
Figure 10:
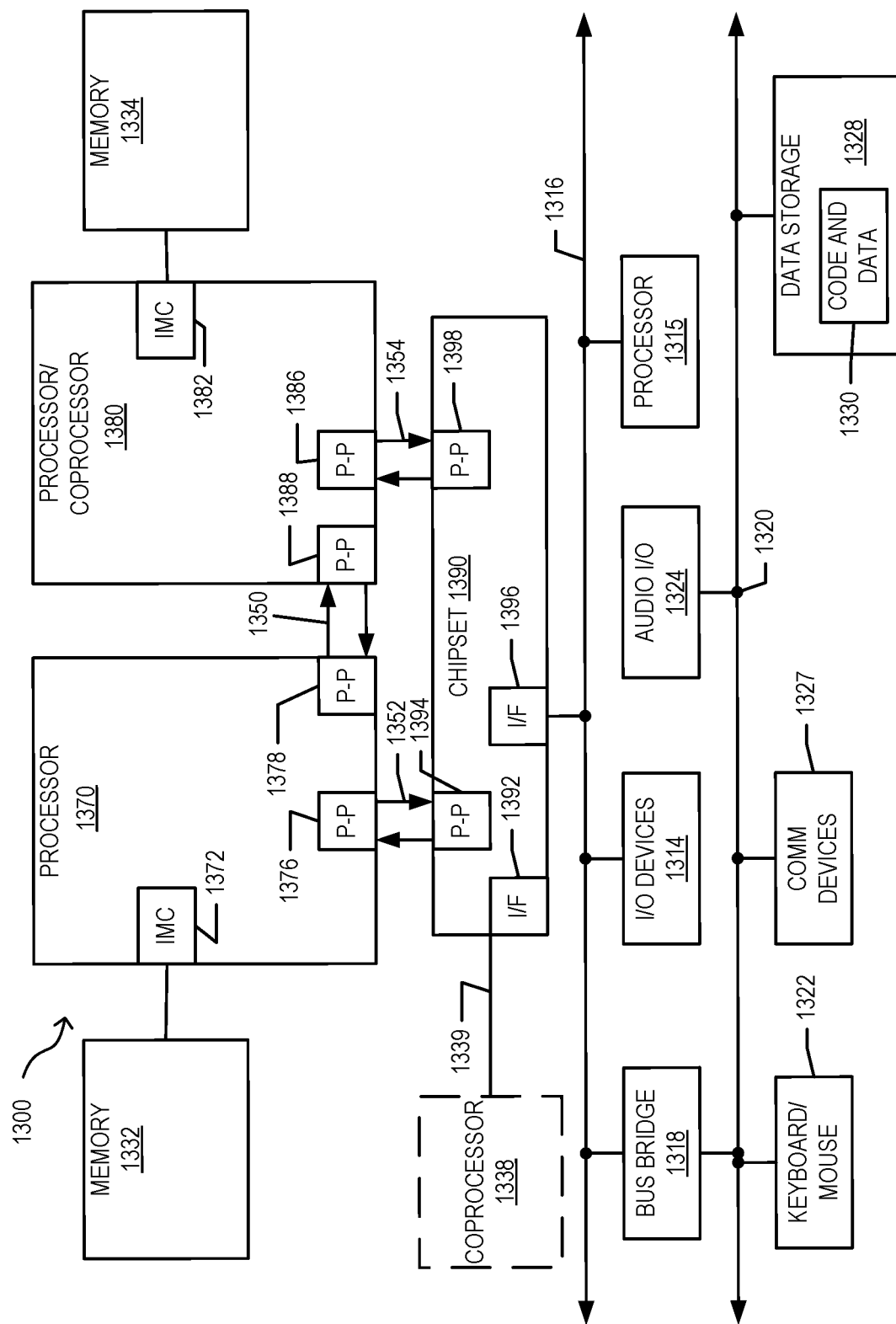
FIGS. 10 and 11 are block diagrams of more specific exemplary systems according to embodiments of the invention.
Figure 11:
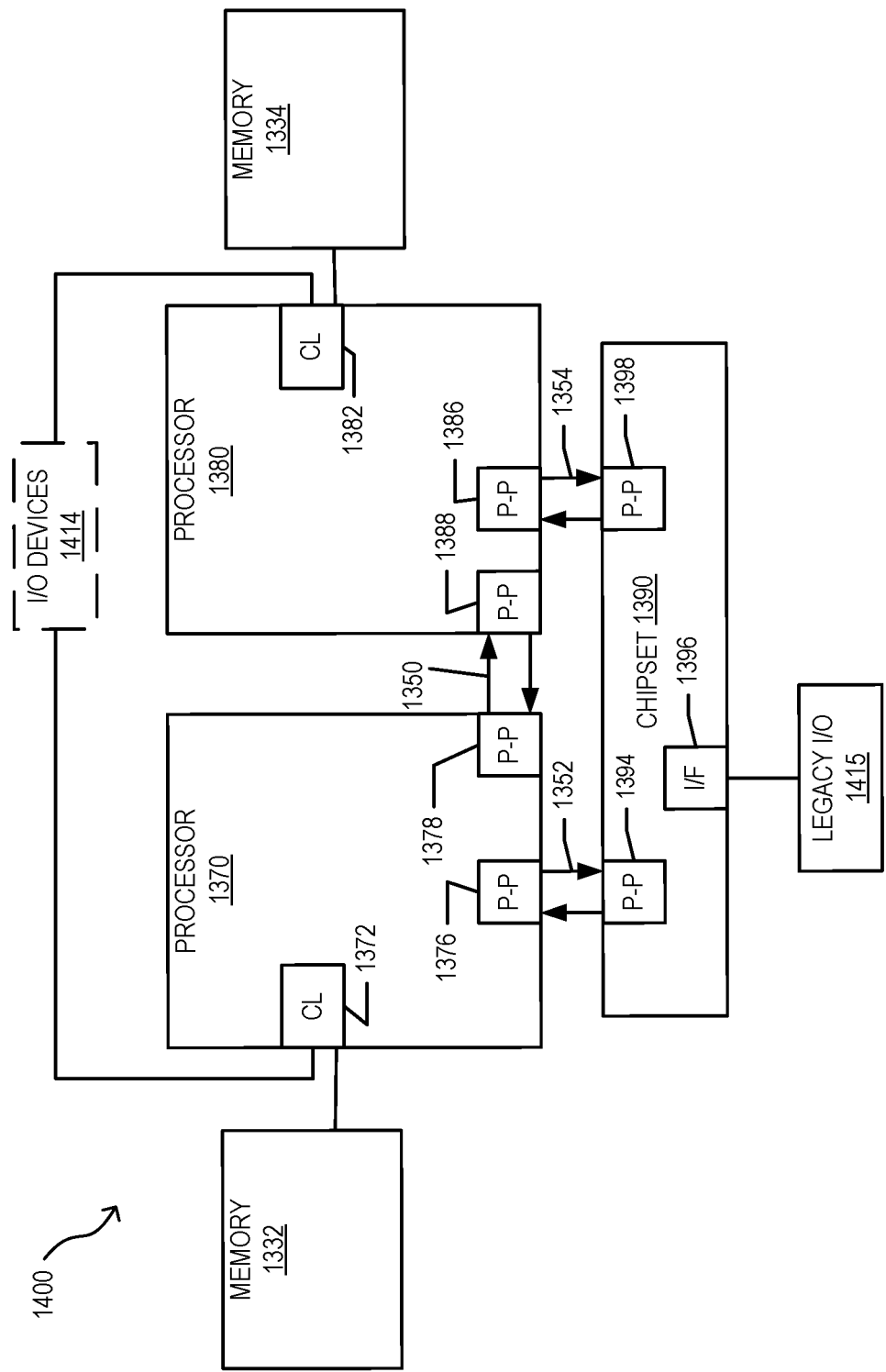

FIGS. 9-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 9 is a block diagram of a system 1200 according to embodiments of the invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor (s) 1245 accept and execute the received coprocessor instructions.

FIGS. 10 and 11 are block diagrams of more specific exemplary systems 1300 and 1400 according to embodiments of the invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

FIG. 11 presents a block diagram of a second more specific exemplary system 1400 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1372 and 1382, respectively. Thus, the CL 1372, 1382 include integrated memory controller units and include I/O control logic. FIG. 11 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 12:
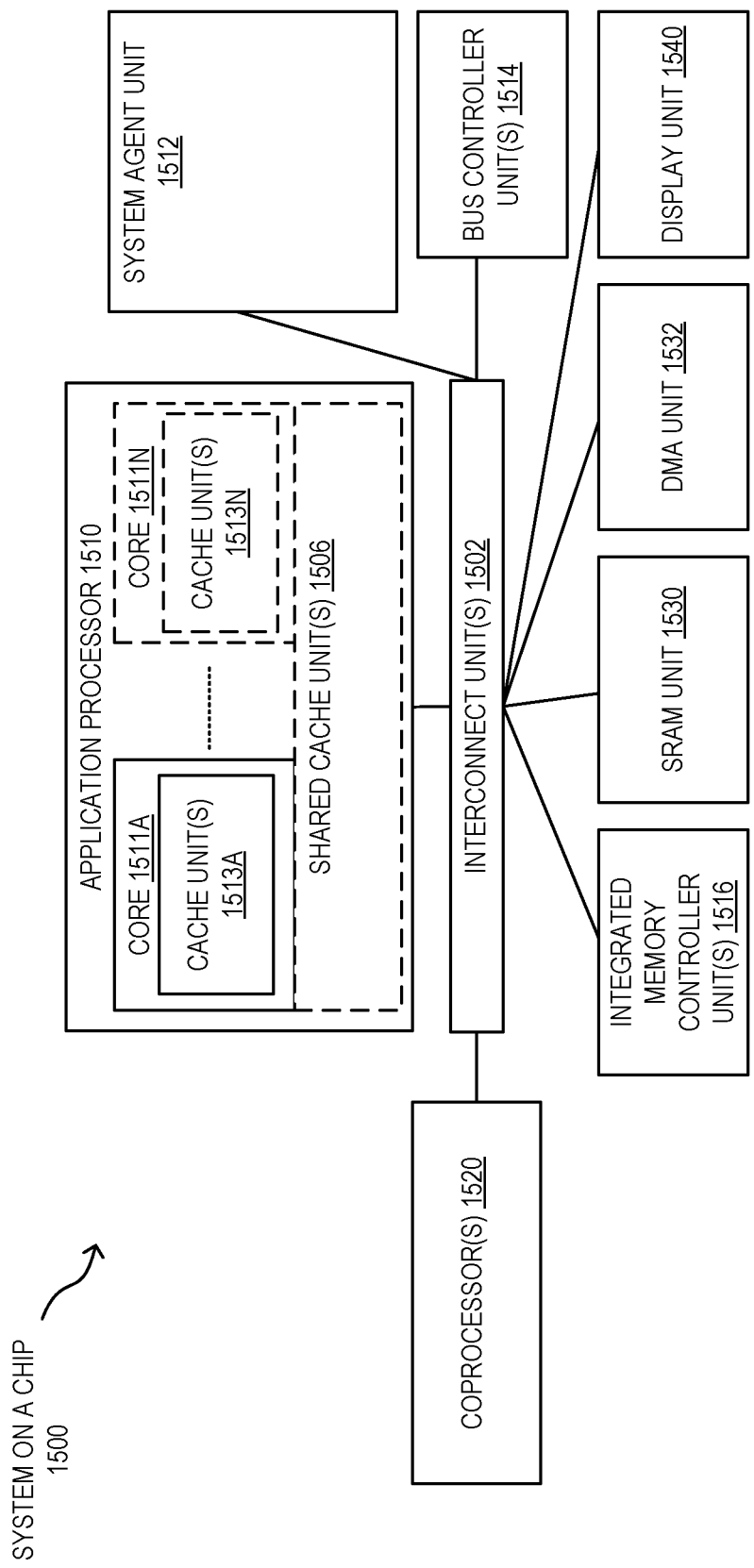
FIG. 12 is a block diagram of a system on a chip according to embodiments of the invention.

FIG. 12 is a block diagram of a system on a chip (SoC) 1500 according to embodiments of the invention. Dashed lined boxes are optional features on more advanced SoCs. In FIG. 12, an interconnect unit(s) 1502 is coupled to: an application processor 1510 which includes a set of one or more cores 1511A-N (including constituent cache units 1104A-N) and shared cache unit(s) 1506; a system agent unit 1512; a bus controller unit(s) 1514; an integrated memory controller unit(s) 1516; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

CONCLUSION

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. In any case, the language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Embodiments include the following examples:

Example A1 is an integrated circuit with technology for generating I/O latency metrics. The integrated circuit comprises an RTC, a read measurement register, and a read latency measurement module. The read latency measurement module comprises control logic to perform operations comprising (a) in response to receipt of read responses that complete read requests associated with an I/O device, automatically calculating read latency for the completed read requests, based at least in part on time measurements from the RTC for initiation and completion of the read requests; (b) automatically calculating an average read latency, based at least in part on the calculated read latencies for the completed read requests; and (c) automatically updating the read measurement register to record the average read latency for the completed read requests.

Example A2 is an integrated circuit according to Example A1, wherein the read latency monitor further comprises control logic to perform operations comprising: (a) automatically determining a minimum read latency for the completed read requests, (b) automatically determining a maximum read latency for the completed read requests, and (c) automatically updating the read measurement register to record the minimum read latency and the maximum read latency.

Example A3 is an integrated circuit according to Example A1, further comprising an I/O manager to manage the read requests. Also, the I/O manager comprises the RTC, the read measurement register, and the read latency measurement module. Example A3 may also include the features of Example A2.

Example A4 is an integrated circuit according to Example A3, wherein the I/O manager is configured to send a device read request to the I/O device in response to receiving a host read request from a processing core. Also, the completed read requests comprise device read requests.

Example A5 is an integrated circuit according to Example A4, wherein the I/O manager complies with revision 3.0 of a PCIe base specification.

Example A6 is an integrated circuit according to Example A5, wherein the I/O manager comprises a PCIe root complex.

Example A7 is a CPU comprising the integrated circuit according to Example A3. The CPU also comprises a processing core in the integrated circuit to send host read requests to the I/O manager. Example A7 may also include the features of any one or more of Example A2 and Examples A4 through A6.

Example A8 is a data processing system comprising the CPU according to Example A7 and the I/O device.

Example A9 is a data processing system according to Example A8, wherein (a) the I/O manager comprises a root port connected to multiple I/O devices, and (b) the operation of automatically calculating average read latency for the completed read requests comprises of automatically calculating average read latency for completed read requests involving any of the I/O devices connected to the root port.

Example B1 is a data processing system with technology for generating I/O latency metrics. The data processing system comprises (a) an I/O manager, (b) an I/O device responsive to the I/O manager, (c) a CPU to communicate with the I/O device via the I/O manager, (d) an RTC in the I/O manager, (e) a read measurement register in the I/O manager, and (f) a read latency measurement module in the I/O manager. Also, the read latency measurement module comprises control logic to perform operations comprising (a) in response to receipt of read responses that complete read requests associated with the I/O device, automatically calculating read latency for the completed read requests, based at least in part on time measurements from the RTC for initiation and completion of the read requests; (b) automatically calculating an average read latency for the completed read requests, based at least in part on the calculated read latencies for the completed read requests; and (c) automatically updating the read measurement register to record the average read latency for the completed read requests.

Example B2 is a data processing system according to Example B1, wherein the read latency monitor further comprises control logic to perform operations comprising (a) automatically determining a minimum read latency for the completed read requests, (b) automatically determining a maximum read latency for the completed read requests, and (c) automatically updating the read measurement register to record the minimum read latency and the maximum read latency.

Example B3 is a data processing system ac to Example B1, wherein the I/O manager is configured to send a device read request to the I/O device in response to receiving a host read request from a processing core. Also, the completed read requests comprise device read requests. Example B3 may also include the features of Example B2.

Example B4 is a data processing system according to Example B3, wherein the I/O manager complies with revision 3.0 of a PCIe base specification.

Example B5 is a data processing system according to Example B4, wherein the I/O manager comprises a PCIe root complex.

Example B6 is a data processing system according to Example B1, wherein the I/O manager comprises a root port connected to multiple I/O devices. Also, the operation of automatically calculating average read latency for the completed read requests comprises of automatically calculating average read latency for completed read requests involving any of the I/O devices connected to the root port. Example B6 may also include the features of any one or more of Examples B2 through B5.

Example C1 is a method for generating I/O latency metrics. The method comprises (a) at a read latency measurement module in an I/O manager of a data processing system, in response to receipt of read responses that complete read requests associated with an I/O device, automatically calculating read latencies for the completed read requests, based at least in part on time measurements from an RTC for initiation and completion of the read requests; (b) at the read latency measurement module, automatically calculating an average read latency for the completed read requests, based at least in part on the calculated read latencies for the completed read requests; and (c) automatically updating a read measurement register in the I/O manager to record the average read latency for the completed read requests.

Example C2 is a method according to Example C1, further comprising (a) at the read latency measurement module, automatically determining a minimum read latency for the completed read requests and automatically determining a maximum read latency for the completed read requests; and (b) automatically updating the read measurement register to record the minimum read latency and the maximum read latency.

Example C3 is a method according to Example C1, further comprising (a) at the I/O manager, receiving a host read request from a processing core of the data processing system; and (b) automatically sending a device read request from the I/O manager to the I/O device, in response to receiving the host read request from the processing core. Also, the completed read requests comprise device read requests. Example C3 may also include the features of Example C2.

Example C4 is a method according to Example C3, further comprising, at the I/O manager, managing read requests as a PCIe root complex, in accordance with revision 3.0 of a PCIe base specification.

Example C5 is a method according to Example C1, further comprising receiving the read responses via a root port of the I/O manager that is connected to multiple I/O devices. Also, the operation of automatically calculating average read latency for the completed read requests comprises of automatically calculating average read latency for completed read requests involving any of the I/O devices connected to the root port. Example C5 may also include the features of any one or more of Examples C2 through C4.

Example D1 is an integrated circuit with technology for generating I/O latency metrics. The integrated circuit comprises an I/O manager to manage read requests, wherein the I/O manager complies with revision 3.0 of a Peripheral Component Interconnect Express (PCIe) base specification. The integrated circuit further comprises (a) an RTC in the I/O manager, a read measurement register in the I/O manager, and a read latency measurement module in the I/O manager. The read latency measurement module comprises control logic to perform operations comprising (a) in response to receipt of read responses that complete read requests associated with an I/O device, automatically calculating read latency for the completed read requests, based at least in part on time measurements from the RTC for initiation and completion of the read requests; (b) automatically calculating an average read latency for the completed read requests, based at least in part on the calculated read latencies for the completed read requests; and (c) automatically updating the read measurement register to record the average read latency for the completed read requests.

Example D2 is an integrated circuit according to Example D1, wherein the read latency monitor further comprises control logic to perform operations comprising (a) automatically determining a minimum read latency for the completed read requests; (b) automatically determining a maximum read latency for the completed read requests; and (c) automatically updating the read measurement register to record the minimum read latency and the maximum read latency.

Example D3 is an integrated circuit according to Example D1, wherein the I/O manager comprises a PCIe root complex. Example D3 may also include the features of Example D2.

In view of the wide variety of useful permutations that may be readily derived from the example embodiments described herein, this detailed description is intended to be illustrative only, and should not be construed as limiting the scope of coverage.

What is claimed is:

1. An integrated circuit with technology for generating input/output latency metrics, the integrated circuit comprising:
    a real-time clock (RTC);
    a read measurement register; and
    a read latency measurement module, wherein the read latency measurement module comprises control logic to perform operations comprising:
        in response to receipt of read responses that complete read requests associated with an input/output (I/O) device, automatically calculating read latency for the completed read requests, based at least in part on time measurements from the RTC for initiation and completion of the completed read requests;
        automatically calculating an average read latency for the completed read requests, based at least in part on the calculated read latencies for the completed read requests; and
        automatically updating the read measurement register to record the average read latency for the completed read requests.

2. An integrated circuit according to claim 1, wherein the read latency monitor further comprises control logic to perform operations comprising:
    automatically determining a minimum read latency for the completed read requests;
    automatically determining a maximum read latency for the completed read requests; and
    automatically updating the read measurement register to record the minimum read latency and the maximum read latency.

3. An integrated circuit according to claim 1, further comprising:
    an I/O manager to manage the read requests, wherein the I/O manager comprises the RTC, the read measurement register, and the read latency measurement module.

4. An integrated circuit according to claim 3, wherein:
    the I/O manager is configured to send a device read request to the I/O device in response to receiving a host read request from a processing core; and
    the completed read requests comprise device read requests.

5. An integrated circuit according to claim 4, wherein the I/O manager complies with revision 3.0 of a Peripheral Component Interconnect Express (PCIe) base specification.

6. An integrated circuit according to claim 5, wherein the I/O manager comprises a PCIe root complex.

7. A central processing unit (CPU) comprising:
    the integrated circuit according to claim 3; and
    a processing core in the integrated circuit to send host read requests to the I/O manager.

8. A data processing system comprising:
    the CPU according to claim 7; and
    the I/O device.

9. A data processing system according to claim 8, wherein:
    the I/O manager comprises a root port connected to multiple I/O devices; and
    the operation of automatically calculating average read latency for the completed read requests comprises of automatically calculating average read latency for completed read requests involving any of the I/O devices connected to the root port.

10. A data processing system with technology for generating input/output latency metrics, the data processing system comprising:
    an input/output (I/O) manager;
    an I/O device responsive to the I/O manager;
    a central processing unit (CPU) to communicate with the I/O device via the I/O manager;
    a real-time clock (RTC) in the I/O manager;
    a read measurement register in the I/O manager; and
    a read latency measurement module in the I/O manager, wherein the read latency measurement module comprises control logic to perform operations comprising:
        in response to receipt of read responses that complete read requests associated with the I/O device, automatically calculating read latency for the completed read requests, based at least in part on time measurements from the RTC for initiation and completion of the completed read requests;
        automatically calculating an average read latency for the completed read requests, based at least in part on the calculated read latencies for the completed read requests; and
        automatically updating the read measurement register to record the average read latency for the completed read requests.

11. A data processing system according to claim 10, wherein the read latency monitor further comprises control logic to perform operations comprising:
    automatically determining a minimum read latency for the completed read requests;
    automatically determining a maximum read latency for the completed read requests; and
    automatically updating the read measurement register to record the minimum read latency and the maximum read latency.

12. A data processing system according to claim 10, wherein:
the I/O manager is configured to send a device read request to the I/O device in response to receiving a host read request from a processing core; and
the completed read requests comprise device read requests.

13. A data processing system according to claim 12, wherein the I/O manager complies with revision 3.0 of a Peripheral Component Interconnect Express (PCIe) base specification.

14. A data processing system according to claim 13, wherein the I/O manager comprises a PCIe root complex.

15. A data processing system according to claim 10, wherein:
the I/O manager comprises a root port connected to multiple I/O devices; and
the operation of automatically calculating average read latency for the completed read requests comprises of automatically calculating average read latency for completed read requests involving any of the I/O devices connected to the root port.

16. A method for generating input/output latency metrics, the method comprising:
at a read latency measurement module in an input/output (I/O) manager of a data processing system, in response to receipt of read responses that complete read requests associated with an I/O device, automatically calculating read latencies for the completed read requests, based at least in part on time measurements from a real-time clock (RTC) for initiation and completion of the completed read requests;
at the read latency measurement module, automatically calculating an average read latency for the completed read requests, based at least in part on the calculated read latencies for the completed read requests; and
automatically updating a read measurement register in the I/O manager to record the average read latency for the completed read requests.

17. A method according to claim 16, further comprising:
at the read latency measurement module, automatically determining a minimum read latency for the completed read requests and automatically determining a maximum read latency for the completed read requests; and
automatically updating the read measurement register to record the minimum read latency and the maximum read latency.

18. A method according to claim 16, further comprising:
at the I/O manager, receiving a host read request from a processing core of the data processing system; and
automatically sending a device read request from the I/O manager to the I/O device, in response to receiving the host read request from the processing core; and
wherein the completed read requests comprise device read requests.

19. A method according to claim 18, further comprising:
at the I/O manager, managing read requests as a Peripheral Component Interconnect Express (PCIe) root complex, in accordance with revision 3.0 of a PCIe base specification.

20. A method according to claim 16, further comprising:
receiving the read responses via a root port of the I/O manager that is connected to multiple I/O devices; and
wherein the operation of automatically calculating average read latency for the completed read requests comprises of automatically calculating average read latency for completed read requests involving any of the I/O devices connected to the root port.

21. An integrated circuit with technology for generating input/output latency metrics, the integrated circuit comprising:
an input/output (I/O) manager to manage read requests, wherein the I/O manager complies with revision 3.0 of a Peripheral Component Interconnect Express (PCIe) base specification;
a real-time clock (RTC) in the I/O manager;
a read measurement register in the I/O manager; and
a read latency measurement module in the I/O manager, wherein the read latency measurement module comprises control logic to perform operations comprising:
in response to receipt of read responses that complete read requests associated with an I/O device, automatically calculating read latency for the completed read requests, based at least in part on time measurements from the RTC for initiation and completion of the completed read requests;
automatically calculating an average read latency for the completed read requests, based at least in part on the calculated read latencies for the completed read requests; and
automatically updating the read measurement register to record the average read latency for the completed read requests.

22. An integrated circuit according to claim 21, wherein the read latency monitor further comprises control logic to perform operations comprising:
automatically determining a minimum read latency for the completed read requests;
automatically determining a maximum read latency for the completed read requests; and
automatically updating the read measurement register to record the minimum read latency and the maximum read latency.

23. An integrated circuit according to claim 21, wherein the I/O manager comprises a PCIe root complex.

* * * * *